(12) United States Patent
Deishi

(10) Patent No.: US 8,418,239 B2
(45) Date of Patent: Apr. 9, 2013

(54) AUTHENTICATION METHOD, AUTHENTICATION DEVICE AND INFORMATION PROCESSOR

(75) Inventor: Satoshi Deishi, Ibaraki (JP)

(73) Assignee: Konica Minolta Holdings, Inc., Chiyoda-Ku, Tokyo (JP)

( * ) Notice: Subject to any disclaimer, the term of this patent is extended or adjusted under 35 U.S.C. 154(b) by 1254 days.

(21) Appl. No.: 11/592,107

(22) Filed: Nov. 2, 2006

(65) Prior Publication Data

US 2007/0106893 A1    May 10, 2007

(30) Foreign Application Priority Data

Nov. 4, 2005    (JP) ................................. 2005-321594

(51) Int. Cl.
*G06F 21/00* (2006.01)
(52) U.S. Cl. ......................................................... 726/10
(58) Field of Classification Search .......... 713/161–168; 726/2–4, 10
See application file for complete search history.

(56) References Cited

U.S. PATENT DOCUMENTS

| | | | | |
|---|---|---|---|---|
| 2005/0064846 | A1* | 3/2005 | Karaoguz et al. | 455/411 |
| 2006/0083228 | A1* | 4/2006 | Ong et al. | 370/389 |
| 2007/0162741 | A1* | 7/2007 | Kasaura et al. | 713/156 |

FOREIGN PATENT DOCUMENTS

| | | |
|---|---|---|
| JP | 2004-227394 | 8/2004 |
| JP | 2004-260401 | 9/2004 |
| JP | 2005-123699 | 5/2005 |
| JP | 2005-173816 | 6/2005 |
| JP | 2005-258671 | 9/2005 |
| WO | WO01/13201 | 2/2001 |
| WO | WO01/52470 | 7/2001 |

OTHER PUBLICATIONS

IETF RFC4432, "RSA Key Exchange for the Secure Shell (SSH) Transport Layer Protocol", B. Harris, Mar. 2006, 6 pgs.
IETF RFC2459, "Internet X.509 Public Key Infrastructure Certificate and CRL Profile", R. Housley et al, Jan. 1999, 1-114 pgs.
Federal Information Processing Standards Publication 180-1, "Secure Hash Standard", Apr. 17, 1995, 17 pgs.
IETF RFC1321, "The MD5 Message-Digest Algorithm", Rivest, Apr. 1992.
Japanese Official Communication dated Aug. 10, 2010 for corresponding Japanese patent application No. 2005-321594 and its English translation.
Japanese Official Communication dated Apr. 20, 2010 for corresponding Japanese patent application No. 2005-321594 and its English translation.

* cited by examiner

*Primary Examiner* — Brandon Hoffman
*Assistant Examiner* — Anthony Brown
(74) *Attorney, Agent, or Firm* — Buchanan Ingersoll & Rooney PC

(57) ABSTRACT

Authentication processing is easily performed on a device used as a node in a network. Upon the authentication of a terminal used as the node in the network, when the terminal can communicate with another terminal, the terminal sends an electronic certificate of the terminal per se to the other terminal and requests the other terminal to perform an authentication process of the terminal per se. Conversely, when the terminal cannot communicate with any other terminal, the terminal outputs the electronic certificate of the terminal per se to an authentication device and requests the authentication device to perform authentication of the terminal per se. The authentication device performs authentication of the terminal based on the outputted electronic certificate.

7 Claims, 15 Drawing Sheets

FIG. 5A

STB01(STB)

| COMPUTER NAME | IP ADDRESS | MAC ADDRESS |
|---|---|---|
| PC02 | 192.168.0.102 | 00-11-22-33-44-02 |
| PC09 | 192.168.0.109 | 00-11-22-33-44-09 |

FIG. 5B

STB02(STB)

| COMPUTER NAME | IP ADDRESS | MAC ADDRESS |
|---|---|---|
| PC01 | 192.168.0.101 | 00-11-22-33-44-01 |
| PC03 | 192.168.0.103 | 00-11-22-33-44-03 |
| PC04 | 192.168.0.104 | 00-11-22-33-44-04 |
| PC07 | 192.168.0.107 | 00-11-22-33-44-07 |

FIG. 5C

STB09(STB)

| COMPUTER NAME | IP ADDRESS | MAC ADDRESS |
|---|---|---|
| PC01 | 192.168.0.101 | 00-11-22-33-44-01 |
| PC07 | 192.168.0.107 | 00-11-22-33-44-07 |
| PC08 | 192.168.0.108 | 00-11-22-33-44-08 |

FIG. 5D

STB10(STB)

| COMPUTER NAME | IP ADDRESS | MAC ADDRESS |
|---|---|---|
| PC01 | 192.168.0.101 | 00-11-22-33-44-01 |

FIG. 7A
SBT01(SBT)

| COMPUTER NAME | IP ADDRESS | MAC ADDRESS |
|---|---|---|
| PC02 | 192.168.0.102 | 00-11-22-33-44-02 |
| PC09 | 192.168.0.109 | 00-11-22-33-44-09 |
| PC10 | 192.168.0.110 | 00-11-22-33-44-10 |

FIG. 7B
SBT02(SBT)

| COMPUTER NAME | IP ADDRESS | MAC ADDRESS |
|---|---|---|
| PC01 | 192.168.0.101 | 00-11-22-33-44-01 |
| PC03 | 192.168.0.103 | 00-11-22-33-44-03 |
| PC04 | 192.168.0.104 | 00-11-22-33-44-04 |
| PC07 | 192.168.0.107 | 00-11-22-33-44-07 |
| PC10 | 192.168.0.110 | 00-11-22-33-44-10 |

FIG. 7C
SBT09(SBT)

| COMPUTER NAME | IP ADDRESS | MAC ADDRESS |
|---|---|---|
| PC01 | 192.168.0.101 | 00-11-22-33-44-01 |
| PC07 | 192.168.0.107 | 00-11-22-33-44-07 |
| PC08 | 192.168.0.108 | 00-11-22-33-44-08 |
| PC10 | 192.168.0.110 | 00-11-22-33-44-10 |

FIG. 7D
SBT10(SBT)

| COMPUTER NAME | IP ADDRESS | MAC ADDRESS |
|---|---|---|
| PC01 | 192.168.0.101 | 00-11-22-33-44-01 |
| PC02 | 192.168.0.102 | 00-11-22-33-44-02 |
| PC09 | 192.168.0.109 | 00-11-22-33-44-09 |

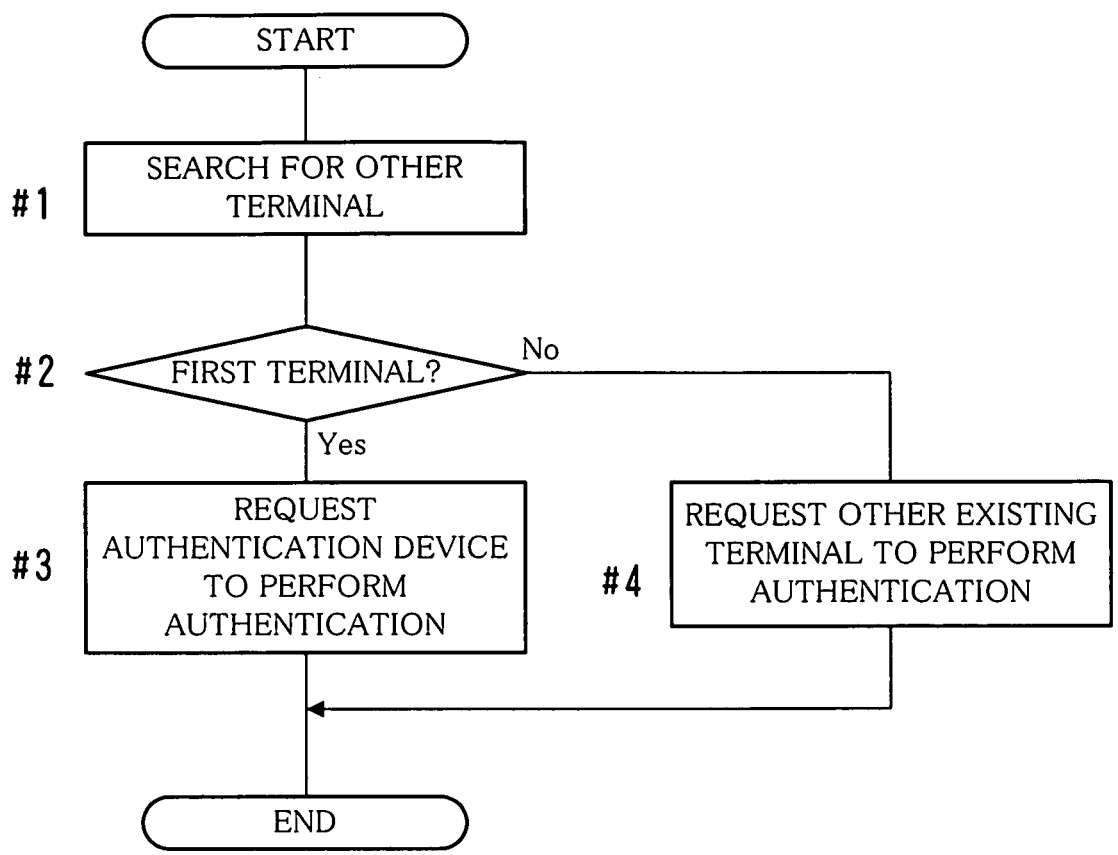

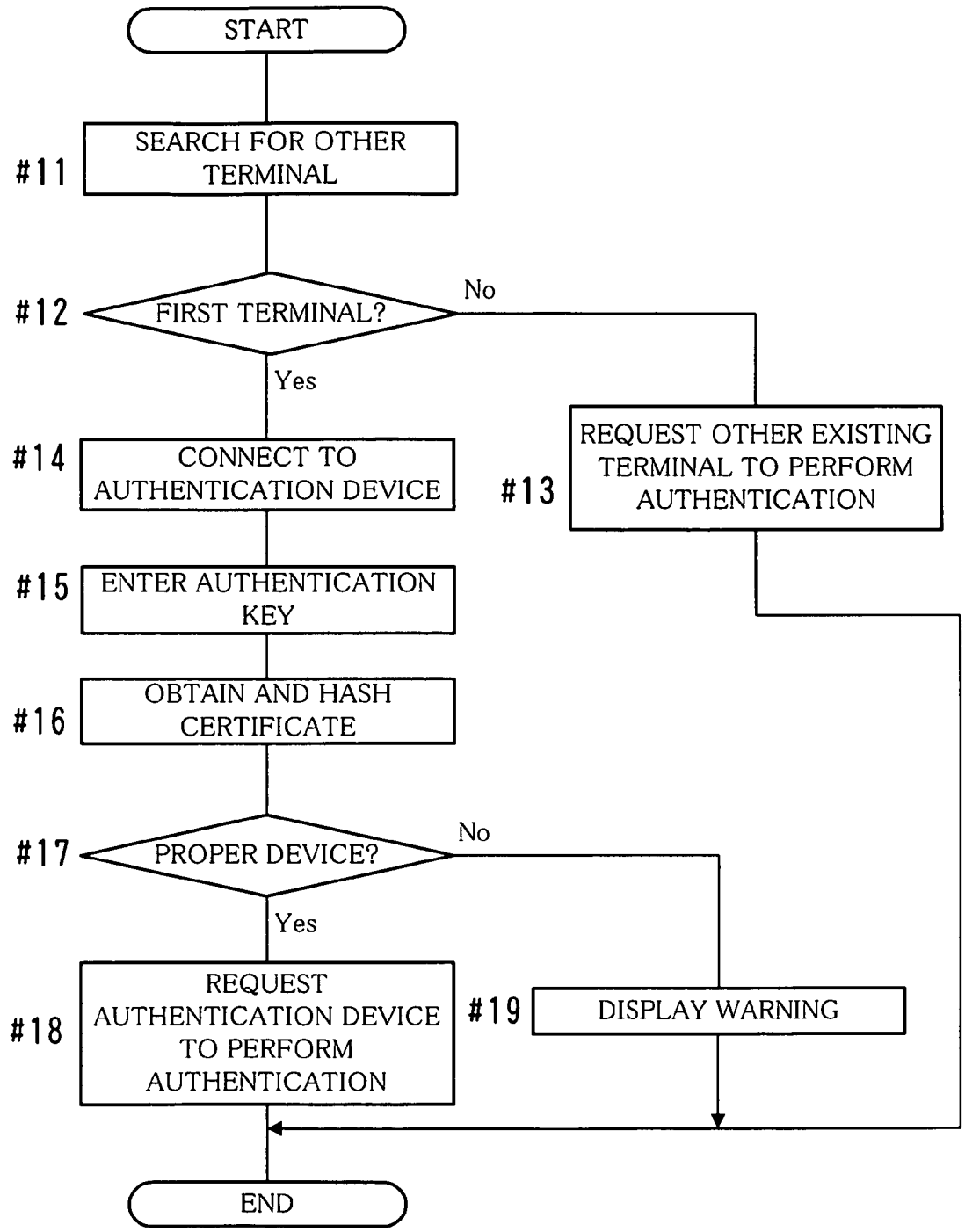

AUTHENTICATION METHOD, AUTHENTICATION DEVICE AND INFORMATION PROCESSOR

This application is based on Japanese patent application No. 2005-321594 filed on Nov. 4, 2005, the contents of which are hereby incorporated by reference.

BACKGROUND OF THE INVENTION

1. Field of the Invention

The present invention relates to a method for authenticating an information processor such as an MFP, a personal computer or a workstation each of which is used as a node in a network.

2. Description of the Related Art

The technology has been widespread for interconnecting a plurality of information processors (nodes) such as personal computers via a communications line to form a network and for exchanging data between the information processors. Networks come in various types. A Peer-to-Peer (P2P) network, which is one of the various types of networks, is better than the other types of networks in that it can be easily established. In addition, the P2P network has a feature that each node has high anonymity.

However, the feature of the high anonymity may be a defect in the P2P network. More specifically, if a user lets his/her information processor join the P2P network, then he/she must to exchange data with a device having high anonymity. In addition, the data ends up being relayed by a device having high anonymity. Thus, the feature of the high anonymity makes it difficult for the user to verify the authenticity of devices within the network, which disturbs the user.

In order to establish a P2P network that makes users feel secure, it is required that the authenticity of nodes included in the network can be easily verified. Needless to say, in the case where other types of networks except the P2P network are established, the authenticity of each node is preferably verified. Further, in order to make users feel secure, the authenticity of a standalone device is preferably verified in advance in view of the case where the standalone device will probably join a network and the case where it will exchange data with other devices through a removable disk such as a floppy disk. For these purposes, device authentication is necessary.

The method described in Japanese unexamined patent publication No. 2004-227394 is proposed as a method for authenticating devices making up a P2P network. According to the method, in the case where one computer requests contents from the other computer, a management computer creates authentication information for access used for access authentication of the computer on a contents request side to the computer on a contents distribution side.

According to the method described in the publication, however, it is necessary to set the management computer for generating the authentication information for access. The setting and operation of the management computer places a heavy burden on an administrator. In addition, advanced knowledge may be required.

SUMMARY OF THE INVENTION

The present invention is directed to solve the problems pointed out above, and therefore, an object of the present invention is to facilitate an authentication process of devices used as nodes in a network compared to conventional cases.

A method according to one aspect of the present invention is a method for authenticating an information processor in a network where a plurality of information processors are capable of joining. The method includes, when a first information processor is connected to the network, determining whether or not a second information processor having a function of authenticating other information processor joins the network, requesting, by the first information processor, the second information processor to perform an authentication process when the second information processor joins the network, and requesting, by the first information processor, an authentication device to perform an authentication process when the second information processor does not join the network, performing by the second information processor the authentication process of the first information processor when the request is made by the first information processor, and performing by the authentication device the authentication process of the first information processor when the request is made by the first information processor.

Preferably, the second information processor is authenticated by the authentication device before performing the authentication process of the first information processor.

More preferably, the first information processor verifies authenticity of the authentication device before requesting the authentication device to perform the authentication process.

Further, the first information processor obtains first key information from the authentication device and second key information from a device other than the authentication device, and the first information processor verifies the authenticity of the authentication device based on the first key information and the second key information.

Moreover, the first key information is an electronic certificate of the authentication device, and the authenticity of the authentication device is verified by determining whether a value obtained by substituting the electronic certificate into a predetermined hash function corresponds to the second information.

Furthermore, each of the second information processor and the authentication device performs the authentication process of the first information processor by verifying an electronic certificate of the first information processor.

These and other characteristics and objects of the present invention will become more apparent by the following descriptions of preferred embodiments with reference to drawings.

BRIEF DESCRIPTION OF THE DRAWINGS

FIGS. 5A-5D show examples of a connection table.

FIGS. 7A-7D show examples of the connection table updated in response to the participation of a PC 10.

FIG. 14 is a flowchart showing an example of a processing flow upon starting a terminal.

FIG. 15 is a flowchart showing a modification of the processing flow upon starting a terminal.

DESCRIPTION OF THE PREFERRED EMBODIMENTS

Figure 1:
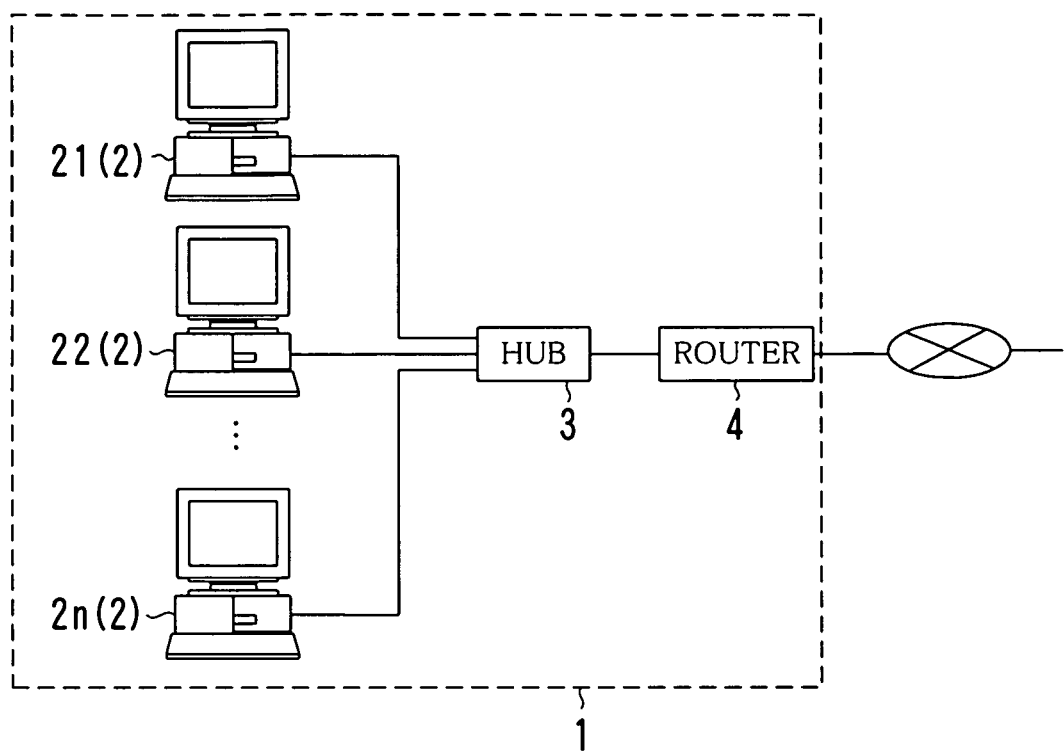
FIG. 1 is a diagram showing an example of the overall configuration of a network.
Figure 2:
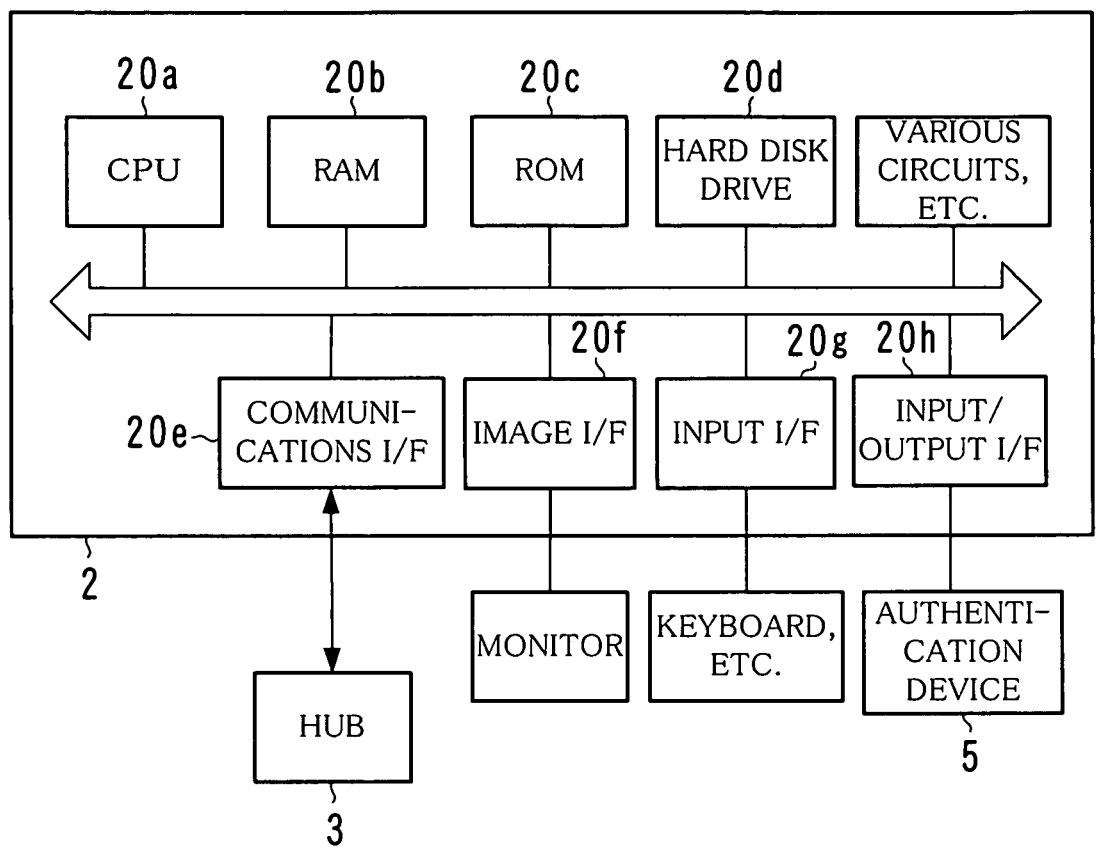
FIG. 2 is a diagram showing an example of a hardware configuration of a terminal.
Figure 3:
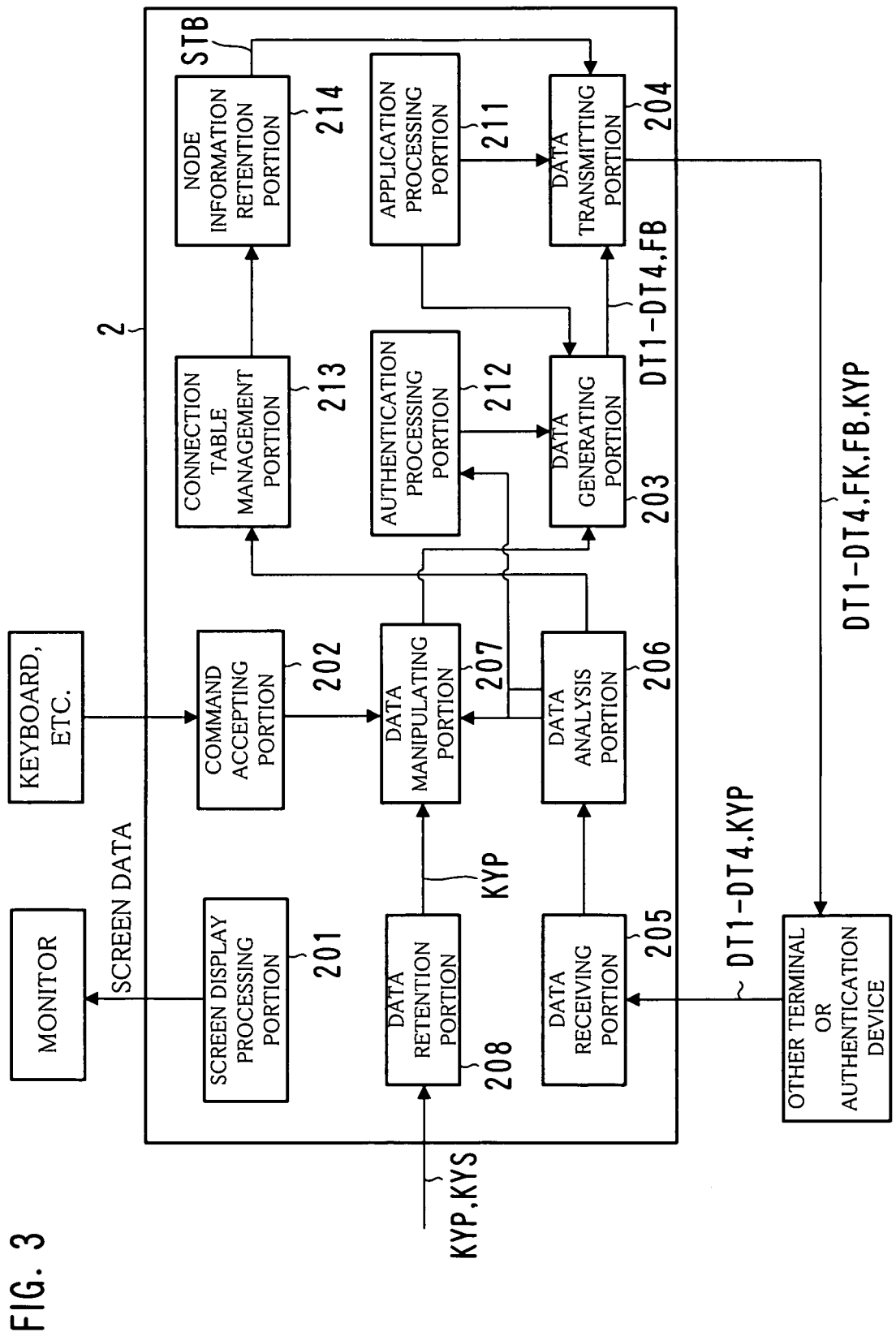
FIG. 3 is a diagram showing an example of a functional configuration of the terminal.

Referring to FIGS. 1, 2 and 3, there are described an example of the overall configuration of a network 1, an example of a hardware configuration of a terminal 2 and an example of a functional configuration of the terminal 2.

Referring to FIG. 1, the network 1 is a Local Area Network (LAN) configured by nodes such as a plurality of the terminals 2 (21, 22, ..., 2n), a hub 3 and a router 4. These terminals 2 are connected to the hub 3 in a star topology with twisted pair cables. The hub 3 and the router 4 are interconnected also with a twisted pair cable. The following is a description of a case in which data communications is performed between the terminals 2, i.e., hosts among these nodes.

The terminals 2 are devices such as personal computers, workstations or printers for executing processing of data input and output with other device. The following is a description of a case in which personal computers are used as the terminals 2.

As shown in FIG. 2, the terminal 2 includes a CPU 20a, a RAM 20b, a ROM 20c, a hard disk drive 20d, a communications interface 20e, an image interface 20f, an input interface 20g, an input/output interface 20h and various other circuits or devices. The terminals 2 are given an IP address and a MAC address each in order to distinguish each terminal from other terminals.

The communications interface 20e is a Network Interface Card (NIC), and is connected to any port of the hub 3 via the twisted pair cable. The image interface 20f is connected to a monitor, and outputs a video signal for displaying a screen to the monitor. The input interface 20g is connected to an input device such as a keyboard or a mouse, and inputs a signal indicating the content of a user's operation from these input devices.

The input/output interface 20h is an interface such as Universal Serial Bus (USB), IEEE1394 or SCSI and is used to connect to an authentication device 5. FIG. 2 shows a case where the terminal 2 is locally connected to the authentication device 5. In the case where the authentication device 5 is located at a remote location, the terminal 2 is connected thereto with the communications interface 20e via a LAN line. The authentication device 5 will be described later.

As shown in FIG. 3, on the hard disk drive 20d are stored programs and data for implementing functions of a screen display processing portion 201, a command accepting portion 202, a data generating portion 203, a data transmitting portion 204, a data receiving portion 205, a data analysis portion 206, a data manipulating portion 207, a data retention portion 208, an application processing portion 211, an authentication processing portion 212, a connection table management portion 213 and a node information retention portion 214. These programs and data are read out to the RAM 20b as necessary, and the programs are executed by the CPU 20a.

A switching hub is used as the hub 3. Alternatively, a hub having a router function may be used in place of the hub 3 and the router 4.

Figure 4:
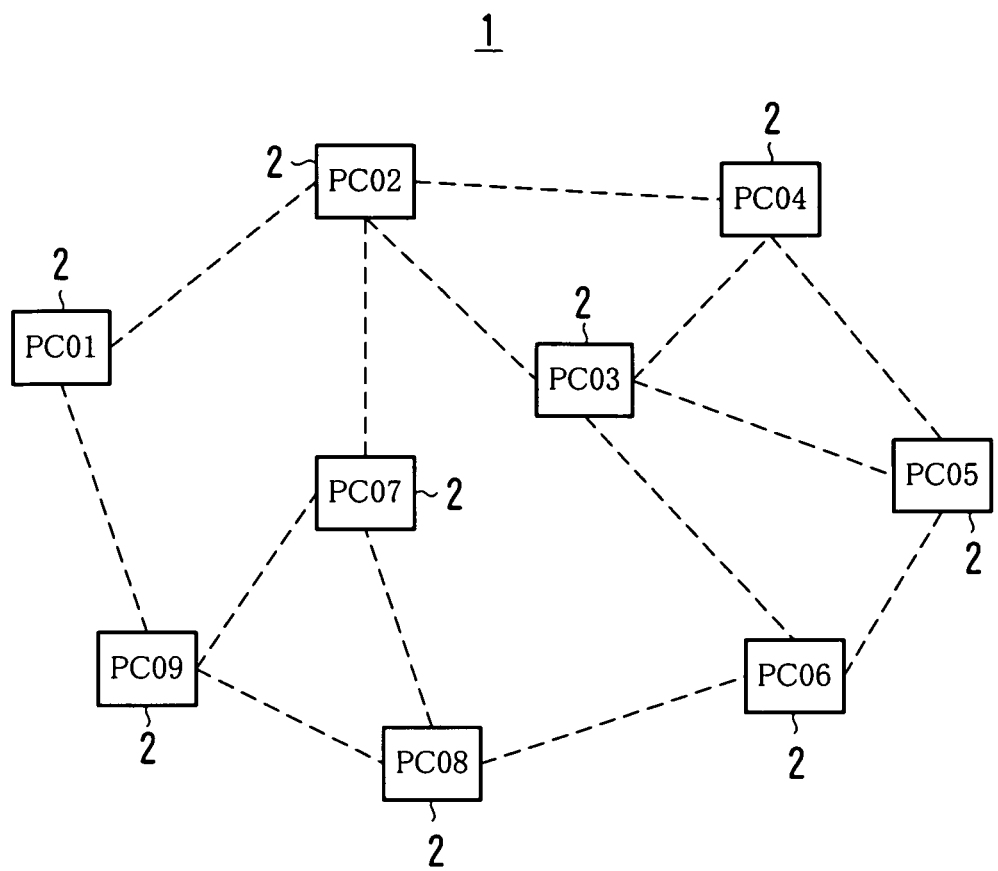
FIG. 4 is a diagram showing an example of a logical topology of the terminals making up the network.
Figure 6:
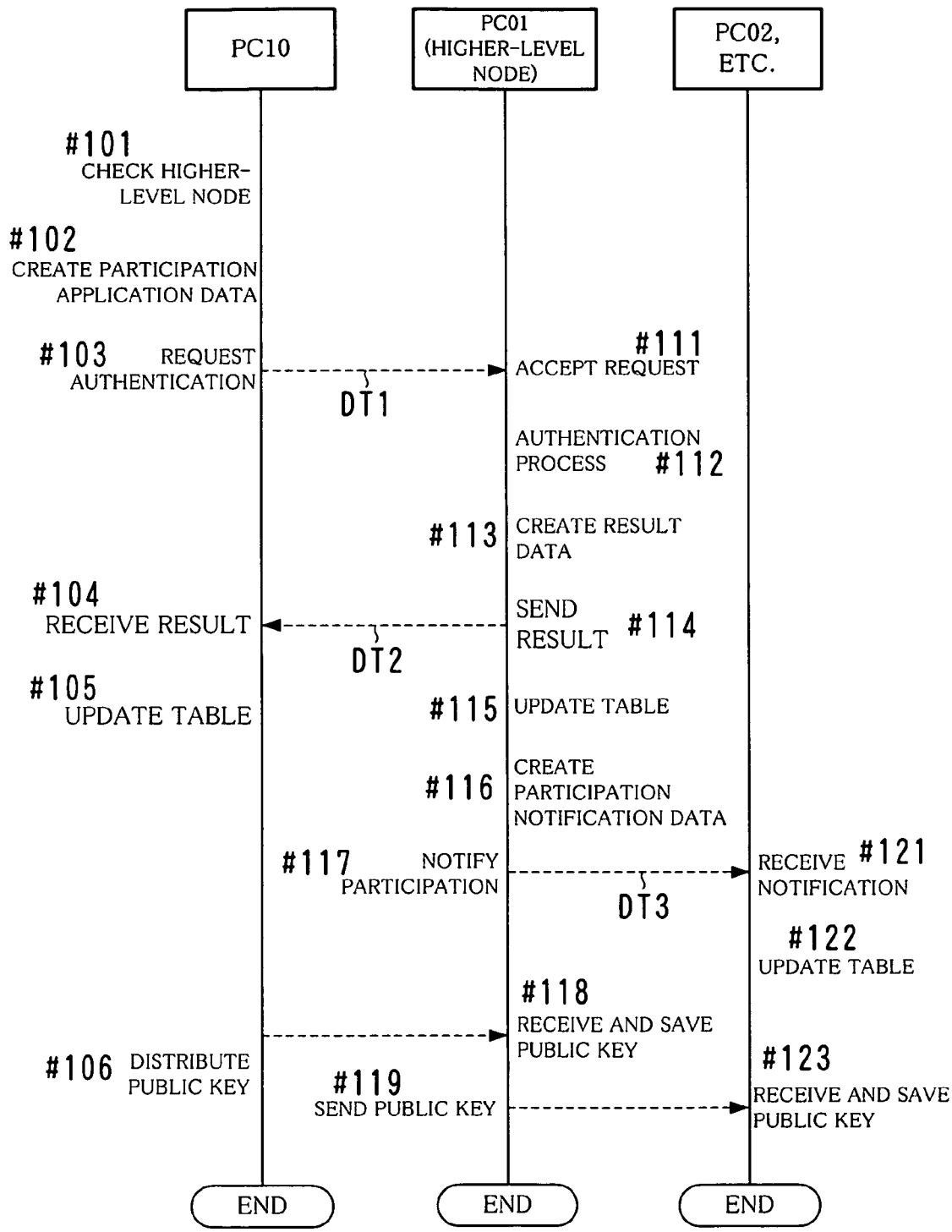
FIG. 6 is a flowchart showing an example of a processing flow when a terminal joins the network.
Figure 8:
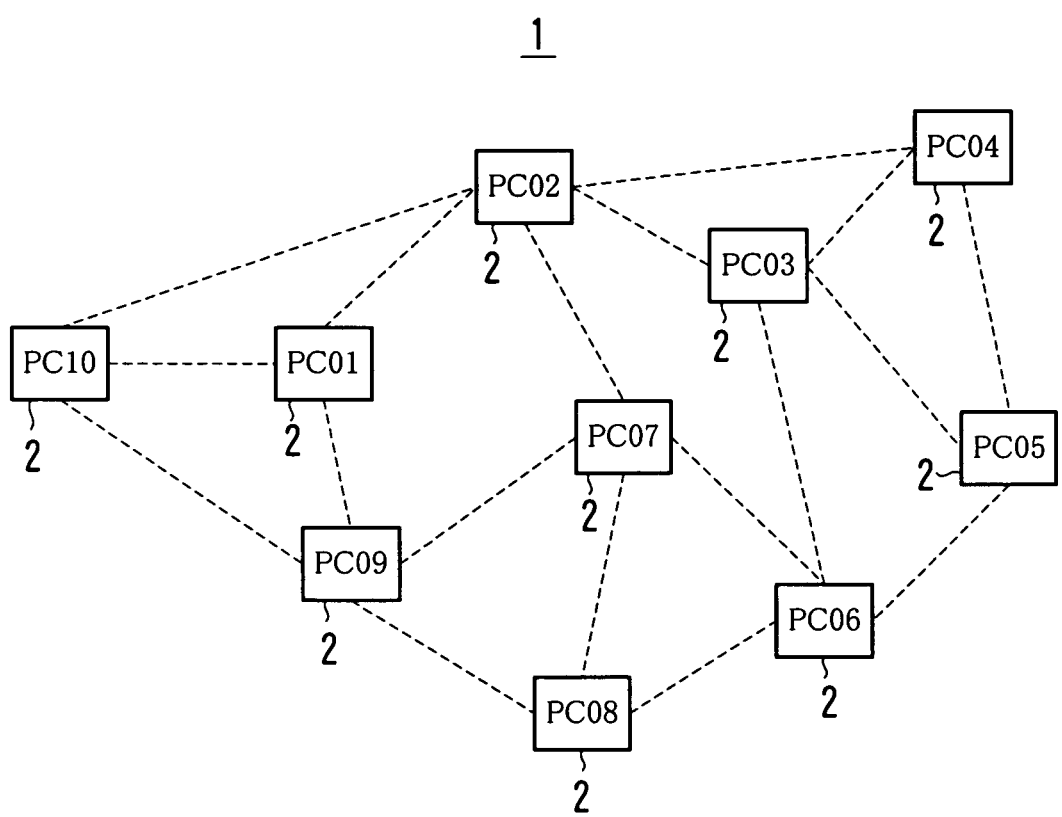
FIG. 8 is a diagram showing an example of the associations of PC01-PC09 after the participation of the PC 10.

FIG. 4 is a diagram showing an example of a logical topology of the terminals 2 making up the network 1, FIGS. 5A-5D show examples of a connection table STB, FIG. 6 is a flowchart showing an example of a processing flow when the terminal 2 joins the network 1, FIGS. 7A-7D show examples of the connection table STB updated in response to the participation of a PC 10, and FIG. 8 is a diagram showing an example of the associations of PC01-PC09 after the participation of the PC 10.

The following is a description of functions and processing details of the portions shown in FIG. 3 when the plural terminals 2 perform Peer-to-Peer (P2P) data communications. Suppose that the network 1 includes nine of the terminals 2 each of which is named "PC01", "PC02", ... and "PC09" as a host name (machine name). Hereinafter, each of the terminals 2 is sometimes described only by using the host name such as "PC01" or "PC02".

Referring to FIG. 4, the terminals 2 are assumed to be disposed in a virtual space. As shown by dotted lines, each terminal 2 is associated with at least one other terminal 2 adjacent in the virtual space. Moreover, due to these associations, all of the terminals 2 are directly or indirectly related to one another. "Directly related" means the state of being connected by one dotted line in FIG. 4, and "indirectly related" means the state of being connected by at least two dotted lines and a node (for example, related in the manner of PC01 and PC08 in FIG. 4).

One terminal 2 out of two of the terminals 2 associated with each other performs node authentication of the other terminal 2. Hereinafter, out of two of the terminals 2 associated with each other, the terminal 2 performing the authentication is sometimes referred to as a "higher-level" or a "higher-level node". The terminal 2 subjected to the authentication is sometimes referred to as a "lower-level" or a "lower-level node".

Referring to FIG. 3, the node information retention portion 214 retains (stores) connection tables STB each of which indicating host names and addresses (IP addresses or MAC addresses) of other terminals 2 with which the terminal 2 per se is associated. In the case, for example, where nine of the terminals 2 are associated in the network 1 as shown in FIG. 4, the PC01, the PC02 and the PC09 retain connection tables STB01, STB02 and STB09 respectively. The details of the connection tables STB01, STB02 and STB09 are shown in FIGS. 5A, 5B and 5C respectively.

The setting of details of the connection table STB is performed by an administrator upon the default setting of the terminal 2. After the terminal 2 is made to join the network 1, the connection table management portion 213 changes the details of the connection table STB appropriately depending on the change of other terminal 2.

The data retention portion 208 retains (stores) a file that may be provided to other terminal 2, i.e., a shared file. Besides, the data retention portion 208 retains a pair of a public key KYP and a private key KYS. The public key KYP is distributed to other terminal 2. Accordingly, the data retention portion 208 retains a public key KYP distributed from other terminal 2 in addition to the public key KYP of its own. As for encryption methods using a public key, "RSA Key Exchange for the Secure Shell (SSH) Transport Layer Protocol", Internet Engineering Task Force Request for Comments (IETF RFC) 4432 should be referred to.

The data generating portion 203 creates data to be sent to other terminal 2 in accordance with the results of processing performed by the data manipulating portion 207, the application processing portion 211, the authentication processing portion 212 or others.

The data transmitting portion 204 converts the data created by the data generating portion 203 to packets to send the same to a terminal 2 as the destination. Further, the data transmitting portion 204 sends data to the authentication device 5 connected via the input/output interface 20h or the communications interface 20e.

The screen display processing portion 201 performs processing for displaying, on a monitor, a screen for providing a user operating the terminal 2 per se with messages or instructions, a screen for the user to enter processing commands and a screen for indicating processing results, for example. The command accepting portion 202 accepts commands entered by the user operating the input device such as the keyboard or the mouse.

The data receiving portion 205 receives packets necessary for the terminal 2 per se of the packets flowing through the network 1. Alternatively, the data receiving portion 205 receives data from the authentication device 5. The data analysis portion 206 extracts necessary portions from the packets or the data received by the data receiving portion 205 to analyze the details thereof. Then, the data analysis portion 206 instructs each of the portions to perform processing in accordance with the analysis result.

When the terminal 2 joins the network 1, e.g., when the terminal 2 is turned ON, when the terminal 2 restarts the operating system or when the terminal 2 is switched from the offline state to the online state, the application processing portion 211 of the terminal 2 performs processing as follows. The application processing portion 211 applies for (requests) the execution of node authentication or user authentication of the terminal 2 per se to any other terminal 2 registered in the connection table STB of the terminal 2 per se. In some cases, the application processing portion 211 makes the request to the authentication device 5. In the case where the terminal 2 per se leaves the network 1, the application processing portion 211 performs processing for making the request to other terminal 2 accordingly.

The authentication processing portion 212 performs node authentication or user authentication requested by other terminal 2 by a well-known method. As for authentication using an electronic certificate, "Internet X. 509 Public Key Infrastructure Certificate and CRL Profile" IETF RFC 2459 should be referred to.

The data manipulating portion 207 performs processing relating to a file managed by the data retention portion 208 of the terminal 2 per se based on a request from a user of the terminal 2 per se (a local user) or other terminal 2.

The following is a further detailed description of processing of the respective portions in the terminal 2 when the terminal 2 joins the network 1, when the terminal 2 leaves the network 1 or when the terminal 2 authenticates a standalone terminal 2.

[Processing upon the Participation in the Network 1]

Referring to FIGS. 6, 7 and 8, there are described an example of a processing flow when the terminal 2 joins the network 1, examples of the connection table STB updated in response to the participation of the PC 10 and an example of the associations of the PC01-PC09 after the PC 10 has participated in the network 1.

Here, the processing details of each of the terminals 2 are described with reference to the flowchart of FIG. 6 when nine of the terminals 2 (PC01-PC09) already join the network 1 and have the associations as shown in FIG. 4 and the PC 10 attempts to join the network 1.

In the PC10, the application processing portion 211 refers to the connection table STB of the PC 10 per se to check a terminal 2 as a higher-level node associated with the PC 10 per se (#101 in FIG. 6). Then, the application processing portion 211 instructs the data generating portion 203 and the data transmitting portion 204 to create data for authentication application and to send the created data to the terminal 2 as the higher-level node, respectively.

Incidentally, the connection table STB of the PC 10 still has related information when the PC 10 joined the network 1 last time. In the case where the PC 10 has never joined the network 1, an administrator previously associates any of the terminals 2 (PC01-PC09) with the PC 10 to register information of the associated terminal 2 in the connection table STB of the PC 10. Here, suppose that the PC 10 is associated with the PC01 and includes the connection table STB10 having the details as shown in FIG. 5D.

The data generating portion 203 creates participation application data DT1 including a host name and an address of the PC 10 per se, a user ID and a password of a user who currently uses the PC 10, information verifying the identity of the PC 10, e.g., an electronic certificate and a command to perform an authentication process (#102). Then, the data transmitting portion 204 converts the participation application data DT1 thus created to packets to send the same to the address of the terminal 2 checked in Step #101, i.e., the PC01 (#103). Thereby, the application for participation in the network 1 and the request for verification processing are made to the PC01 as a higher-level node.

The packets of the participation application data DT1 transmitted by the PC 10 reach the hub 3 once. The hub 3 sends the reached packets to the terminal 2 connected to a port corresponding to the destination address, i.e., the PC01. Thus, the hub 3 is operable to relay data such as the participation application data DT1 only to the terminal 2 as the destination.

In the PC01, the data receiving portion 205 receives the packets, in series, transmitted from the PC 10 via the hub 3. The data analysis portion 206 extracts necessary data from these packets to reproduce the participation application data DT1. In this way, the PC01 accepts the participation application data DT1 from the PC 10 (#111). Note that exchange of other data or file between two terminal 2, which is described later, is also performed using packet communications via the hub 3, as in the case of the participation application data DT1.

The data analysis portion 206 analyzes the participation application data DT1 to determine that a node authentication process and a user authentication process of the PC 10 should be performed. Then, the data analysis portion 206 gives the authentication processing portion 212 a command to perform these authentication processes.

The authentication processing portion 212 performs user authentication based on the user ID and the password indicated in the participation application data DT1 and further performs node authentication of the PC 10 by verifying the authenticity of the electronic certificate (#112). The authenticity of the electronic certificate can be verified by checking whether an issuer of the electronic certificate is a known reliable organization.

As a result of the node authentication and the user authentication, if the authenticity of the PC 10 can be verified, then the data generating portion 203 of the PC01 creates authentication result data DT2 including information indicating that the PC 10 has been authenticated and the details of the connection table STB01 (see FIG. 5A) of the PC01 per se (#113). Then, the data transmitting portion 204 sends the authentication result data DT2 thus created to the address of the PC 10 (#114).

Conversely, if the authenticity of the PC 10 cannot be verified, then the subsequent connection is not allowed. In short, the communications is terminated.

In the PC 10, when the data receiving portion 205 receives the authentication result data DT2 (#104), the data analysis portion 206 analyzes the authentication result data DT2 to give the connection table management portion 213 a command to update the connection table STB10 of the PC 10 per se. Responding to this, the connection table management portion 213 adds and registers to/in the connection table STB of the PC 10 per se host names and addresses of terminals 2 indicated in the received authentication result data DT2 (#105). Thereby, the connection table STB10 is updated as shown in FIG. 7D.

In the PC01, in parallel with the processing in Steps #113 and #114 or before or after, the connection table management portion 213 adds and registers the host name and the address of the PC 10 in the connection table STB01 of the PC01 per se as shown in FIG. 7A (#115). The data generating portion 203 creates participation notification data DT3 for informing that the PC 10 has joined the network 1 (#116). The data transmitting portion 204 sends the participation notification data DT3 to the addresses of the terminals 2 indicated in the connection table STB01 (see FIG. 5A) before the addition and registration in Step #115, i.e., the addresses of the PC02 and the PC09 (#117).

In each of the PC02 and the PC09, when the data receiving portion 205 receives the participation notification data DT3 from the PC01 (#121), the newly-joined terminal 2 that is indicated in the participation notification data DT3, i.e., the PC 10 is added and registered in the connection table STB of each of the PC02 and the PC09 (#122). Thereby, the connection table STB02 of the PC02 and the connection table STB09 of the PC09 are updated as shown in FIGS. 7B and 7C respectively.

In this way, the processing for the PC 10 to join the network 1 is completed. As a result of the processing, the PC 10 ends up being associated with the PC01, the PC02 and the PC09 as shown in FIG. 8.

The data transmitting portion 204 of the PC 10 sends a public key KYP of the PC 10 per se to the PC01 (#106). The public key KYP is further sent from the PC01 to the PC02 and the PC09 (#119). Each of the PC01, the PC02 and the PC09 saves the received public key KYP of the PC 10 in the data retention portion 208 (#118 and #123). Alternatively, a public key KYP of each of the PC01, PC02 and the PC09 may be sent to the PC 10. The public key KYP may be directly sent from the PC 10 to the PC02 and the PC09. Instead, however, the public key KYP may be sent via the PC01, which improves the confidentiality.

Note that the participation application data DT1, the authentication result data DT2, the participation notification data DT3 and the public key KYP are exchanged using an encrypted communications protocol such as a Secure Sockets Layer (SSL) protocol. A shared file stored in the data retention portion 208 is exchanged after being encrypted using a public key KYP or a private key KYS of any of a transmission side and a receipt side. In the case, for example, where the PC 10 and the PC02 exchange data, when the PC02 has the public key KYP of the PC 10, the PC 10 uses its own private key KYS to encrypt a shared file, then to send the encrypted file to the PC02. The PC02 uses the public key KYP of the PC 10 to encrypt a shared file, then to send the encrypted file to the PC 10.

In the case where the PC01 does not join the network 1, the PC 10 is preferably subjected to authentication, for example, in the following three ways: (1) The PC10 waits for the PC01 to join the network 1. (2) The PC 10 is previously associated with the plural terminals 2 and authentication is performed by the terminal 2 other than the PC01. (3) An authentication server is provided outside or inside the network 1 to have the authentication server perform authentication. Instead of these, the PC 10 may be allowed to join the network 1 without being subjected to authentication and the function that can be performed by the PC 10, especially the function relating to security, may be limited.

Figure 9:
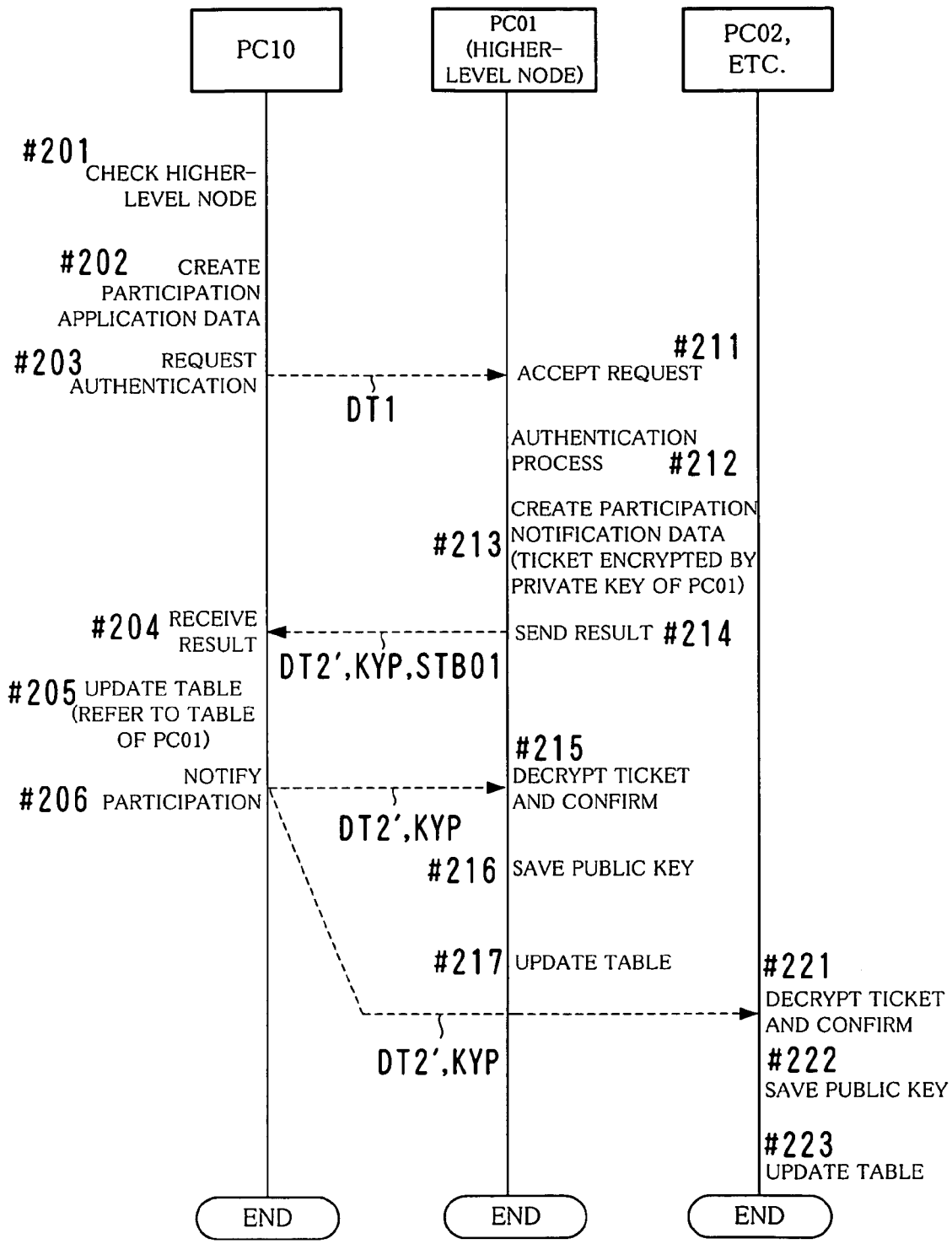
FIG. 9 is a flowchart showing a modification of the processing flow when a terminal joins the network.

FIG. 9 is a flowchart showing a modification of the processing flow when the terminal 2 joins the network 1. The processing described with reference to FIG. 6 may be performed by the method shown in FIG. 9. Note that the description of parts overlapping with the processing described with reference to FIG. 6 is omitted.

Referring to FIG. 9, the processing details of Steps #201-#203, Steps #211 and #212 are the same as those of Steps #101-#103, Steps #111 and #112 described with reference to FIG. 6. More specifically, the PC 10 checks a terminal 2 as a higher-level node, creates participation application data DT1 and sends the participation application data DT1 to the terminal 2 (here, suppose that the terminal 2 is the PC01) (#201-#203). In this way, the application for the participation in the network 1 and the request for verification processing are made to the PC01.

When receiving the participation application data DT1 from the PC 10, the PC01 performs user authentication and node authentication based on the participation application data DT1 (#211 and #212).

As a result of the node authentication and the user authentication, if the authenticity of the PC 10 can be verified, then the PC01 creates authentication result data DT2'. Then, the PC01 uses its own private key KYS to encrypt the authentication result data DT2', then to send the same to the PC 10 (#213 and #214). The authentication result data DT2' serves to inform that the PC 10 is allowed to join the network 1. In addition, the public key KYP and the connection table STB01 of the PC01 are also sent to the PC 10.

When receiving the authentication result data DT2', the public key KYP and the connection table STB01 (#204), the PC 10 updates its own connection table STB10 in accordance with the connection table STB01 (#205). Based on the connection table STB10, the PC 10 sends the received authentication result data DT2' to the higher-level node with the authentication result data DT2' being encrypted (#206). On this occasion, the public key KYP of the PC 10 per se is also sent.

Each of the terminals 2 as the higher-level nodes of the PC10 uses the public key KYP of the PC01 to decrypt the authentication result data DT2' received from the PC 10, then to confirm that the PC 10 is the terminal 2 given authentication (#215 and #221). Then, each of the terminals 2 as the higher-level nodes saves the public key KYP of the PC 10 (#216 and #222) to add the PC 10 to its own connection table STB (#217 and #223).

[Processing Upon Leaving the Network 1]

Figure 10:
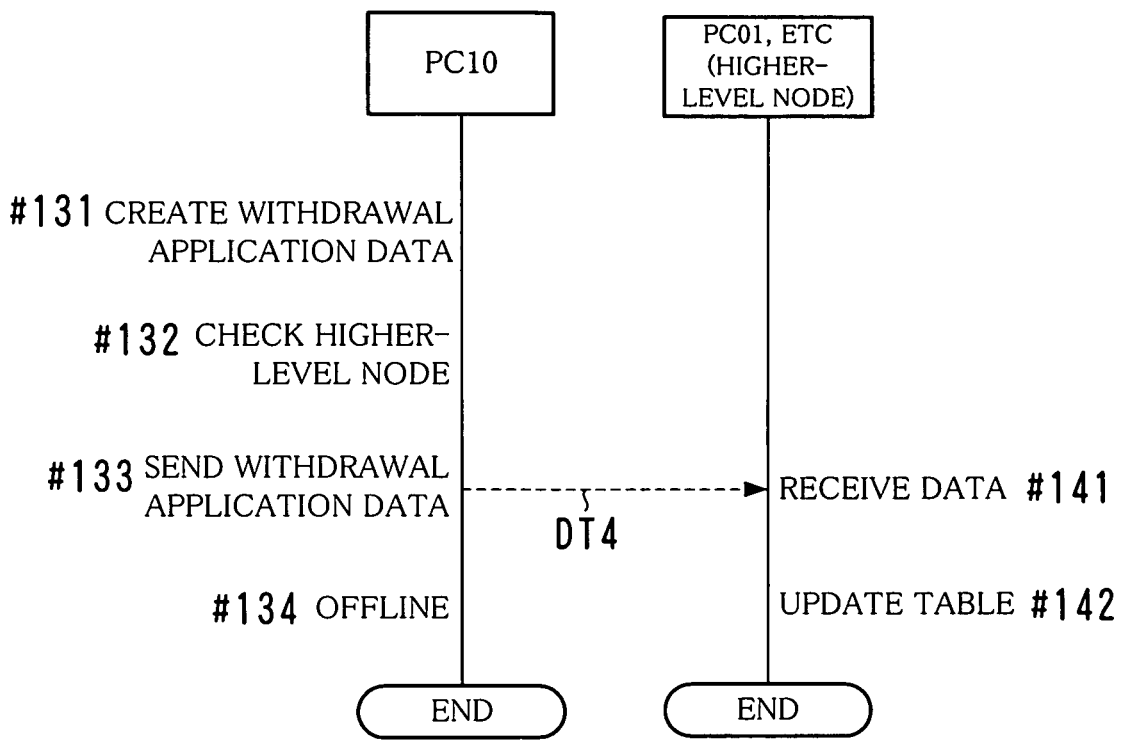
FIG. 10 is a flowchart showing an example of a processing flow when a terminal leaves the network.

FIG. 10 is a flowchart showing an example of a processing flow when the terminal 2 leaves the network 1.

The following is a description of processing details of each of the terminals 2 when the PC 10 leaves the network 1 with reference to the flowchart of FIG. 10.

In the PC 10, the application processing portion 211 gives the data generating portion 203 and the data transmitting portion 204 a command to create data for applying for leaving the network 1 and a command to send the same, respectively.

Responding to this, the data generating portion 203 creates withdrawal application data D4 indicating, for example, the host name of the PC 10 per se and the fact that the PC 10 attempts to leave the network 10 (#131 in FIG. 10). The data transmitting portion 204 sends the withdrawal application data D4 to the addresses of the respective terminals 2 shown in the connection table STB10 of the PC 10 per se (#132 and #133). In the case, for example, where the details as shown in FIG. 7D are indicated in the connection table STB 10, the withdrawal application data D4 is sent to the PC01, the PC02 and the PC09. After that, the communications with the hub 3 is stopped to be switched to the offline state (#134).

In each of the PC01, the PC02 and the PC09, when the data receiving portion 205 receives the withdrawal application data D4 (#141), the data analysis portion 206 analyzes the withdrawal application data D4 to give the connection table management portion 213 a command to update its own connection table STB. Responding to this, the connection table management portion 213 deletes information on the PC 10 from its own connection table STB (#142). In this way, the processing in which the PC10 leaves the network 1 is completed.

[Processing for Authenticating a Standalone Terminal 2]

Figure 11:
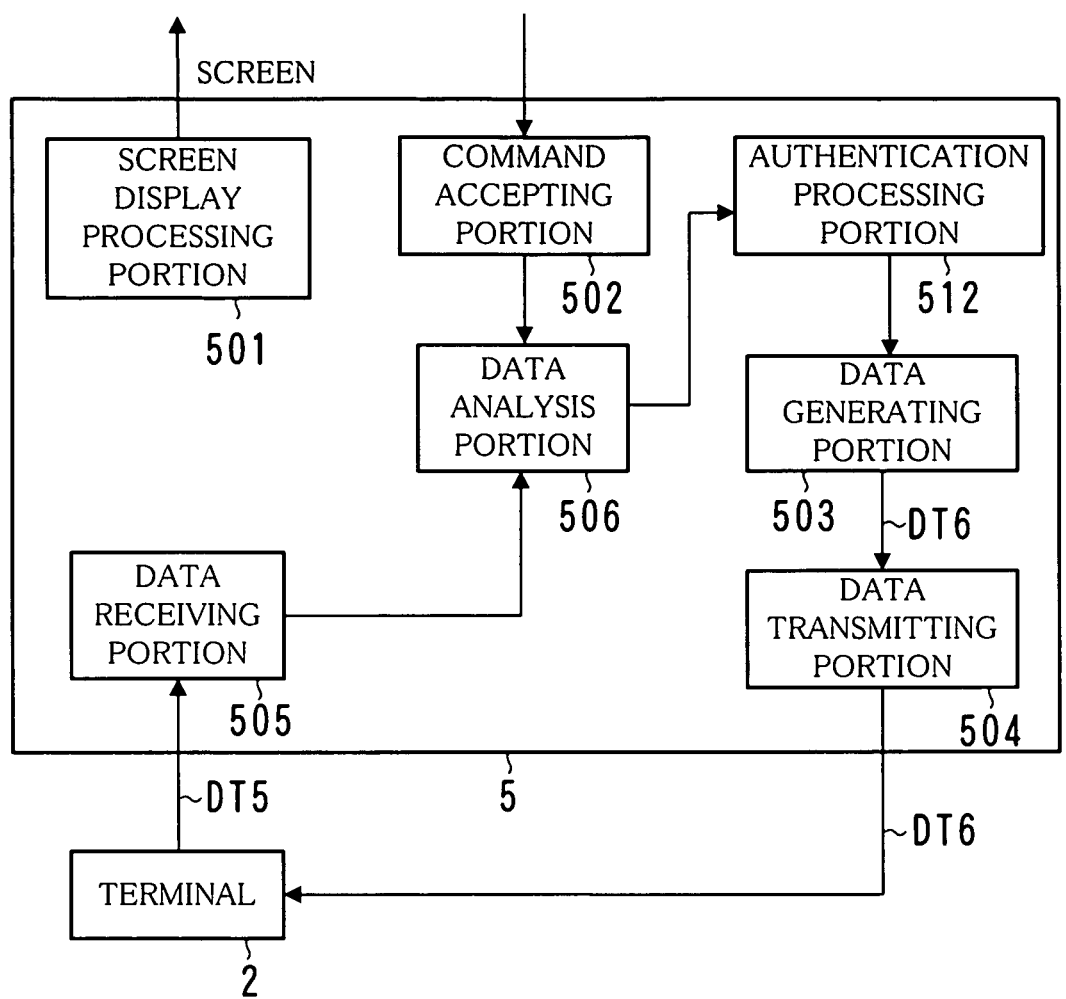
FIG. 11 is a diagram showing an example of a functional configuration of an authentication device.

FIG. 11 is a diagram showing an example of a functional configuration of the authentication device 5.

The terminal 2 that cannot join the network 1, i.e., the standalone terminal 2 cannot perform communications with any other terminals 2. Accordingly, the standalone terminal 2 cannot request any other terminals 2 to perform node authentication and user authentication of the standalone terminal 2 per se. The node authentication and the user authentication of the standalone terminal 2 are performed using the authentication device 5.

The hardware configuration of the authentication device 5 is almost the same as that of the terminal 2 described with reference to FIG. 2. The terminal 2 and the authentication device 5 are interconnected via an interface such as Universal Serial Bus (USB), IEEE1394 or NIC.

As shown in FIG. 11, on a hard disk drive of the authentication device 5 are stored programs and data for implementing functions of a screen display processing portion 501, a command accepting portion 502, a data generating portion 503, a data transmitting portion 504, a data receiving portion 505, a data analysis portion 506 and an authentication processing portion 512. These programs and data are read out to a RAM as necessary, and the programs are executed by a CPU. The authentication device 5 may be, for example, a mobile computer such as a laptop computer or a Personal Digital Assistant (PDA). Alternatively, the authentication device 5 may be a device dedicated to authentication in which a dedicated circuit is used to implement a part or the whole of the functions shown in FIG. 11 by hardware processing.

The screen display processing portion 501 performs processing for displaying, on a monitor, a screen for providing a user operating the authentication device 5 with messages or instructions, a screen for the user to enter processing commands and a screen for indicating processing results, for example. The command accepting portion 502 accepts commands entered by the user operating an input device such as a keyboard or a mouse.

The data receiving portion 505 performs processing for receiving data from the terminal 2 to which the authentication device 5 per se is connected. The data analysis portion 506 analyzes the details of the data received by the data receiving portion 505 to give the respective portions commands to perform processing in accordance with the analysis result.

The authentication processing portion 512 performs node authentication and user authentication requested by the terminal 2 connected to the authentication device 5 per se using a well-known method.

The data generating portion 503 creates data to be sent to the terminal 2 connected to the authentication device 5 per se in accordance with the results of processing performed by the authentication processing portion 512 and others. The data transmitting portion 504 sends to the terminal 2 the data created by the data generating portion 503.

Figure 12:
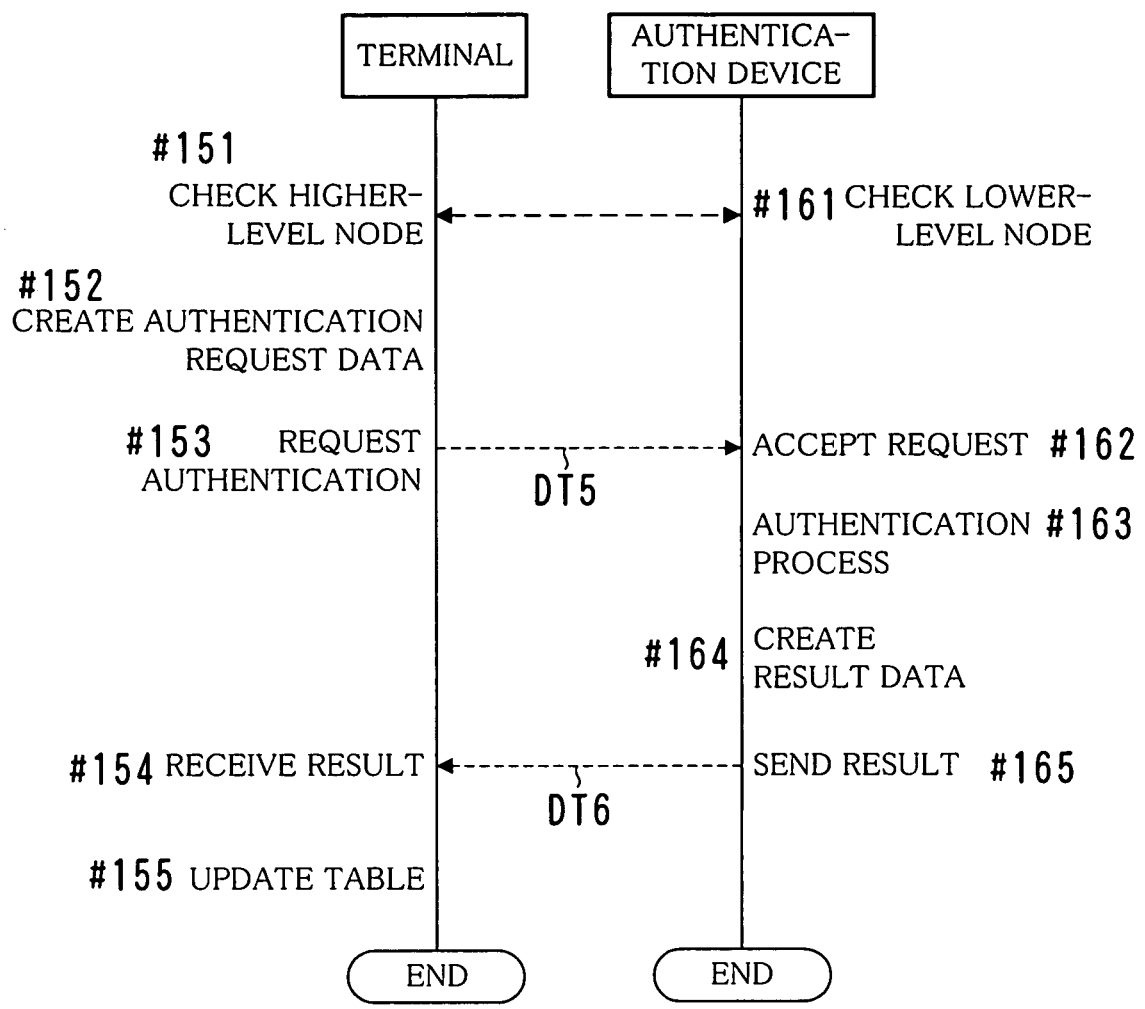
FIG. 12 is a flowchart showing an example of a processing flow when the authentication device is used to perform an authentication process of a terminal.

FIG. 12 is a flowchart showing an example of a processing flow when the authentication device 5 is used to perform an authentication process of the terminal 2.

The following is a description of processing details of the respective portions of the terminal 2 and the authentication device 5 when the standalone terminal 2 is newly installed in an office and the authentication device 5 is made to perform a node authentication process of the terminal 2 in order to verify the authenticity of the terminal 2.

An administrator connects the authentication device 5 to the terminal 2 via an interface such as USB and enters a predetermined command into the terminal 2 or the authentication device 5. Note that the operation may be performed by, instead of the administrator, a service person or an engineer of a manufacturer of the terminal 2 upon the delivery of the terminal 2. The authentication device 5 is preferably imported from the manufacturer of the terminal 2.

When the command is entered, the terminal 2 and the authentication device 5 start processing, for example, according to the procedure shown in the flowchart of FIG. 12. First, the terminal 2 and the authentication device 5 exchange predetermined data to recognize that they are interconnected (#151 and #161).

In the terminal 2, the data generating portion 203 creates authentication request data DT5 including a host name and an address of the terminal 2 per se, a user ID and a password of a user who currently uses the terminal 2, information verifying the identity of the terminal 2, e.g., an electronic certificate and a command to perform an authentication process (#152). The data transmitting portion 204 sends the created authentication request data DT5 to the authentication device 5 (#153). Thereby, the request for an authentication process is made to the authentication device 5.

In the authentication device 5, the data receiving portion 505 receives the authentication request data DT5 and others from the terminal 2 (#162). The data analysis portion 506 determines that a kind of this data is participation application data.

The authentication processing portion 512 performs user authentication based on the user ID and the password indicated in the authentication request data DT5. The authentication processing portion 512 also performs node authentication of the terminal 2 by verifying the authenticity of the electronic certificate (#163).

As a result of the node authentication and the user authentication, if the authenticity of the terminal 2 and others can be verified, then the data generating portion 503 creates authentication result data DT6 indicating that the terminal 2 has been authenticated (#164) and the data transmitting portion 504 sends the authentication result data DT6 to the terminal 2 (#165).

In the terminal 2, when the data receiving portion 205 receives the authentication result data DT6 (#154), the connection table management portion 213 adds and registers to/in the connection table STB of the terminal 2 per se a host name, a MAC address and others of the authentication device 5 indicated in the received authentication result data DT2

(#155). In this way, the node authentication and the user authentication of the terminal 2 are completed.

In some cases, other terminal 2 is connected to the terminal 2 per se via a communications line, so that a network is newly formed. Besides, other terminals 2 may join the network one after another. In such cases, the processing for the node authentication and the user authentication is performed according to the procedures described earlier with reference to FIG. 6 or FIG. 9. In short, the terminal 2 authenticated by the authentication device 5 performs authentication of the other terminals 2.

The authentication using the method described with reference to FIG. 12 is also used in the case where there are no other reliable terminals 2 in a network that the terminal 2 attempts to join.

Figure 13:
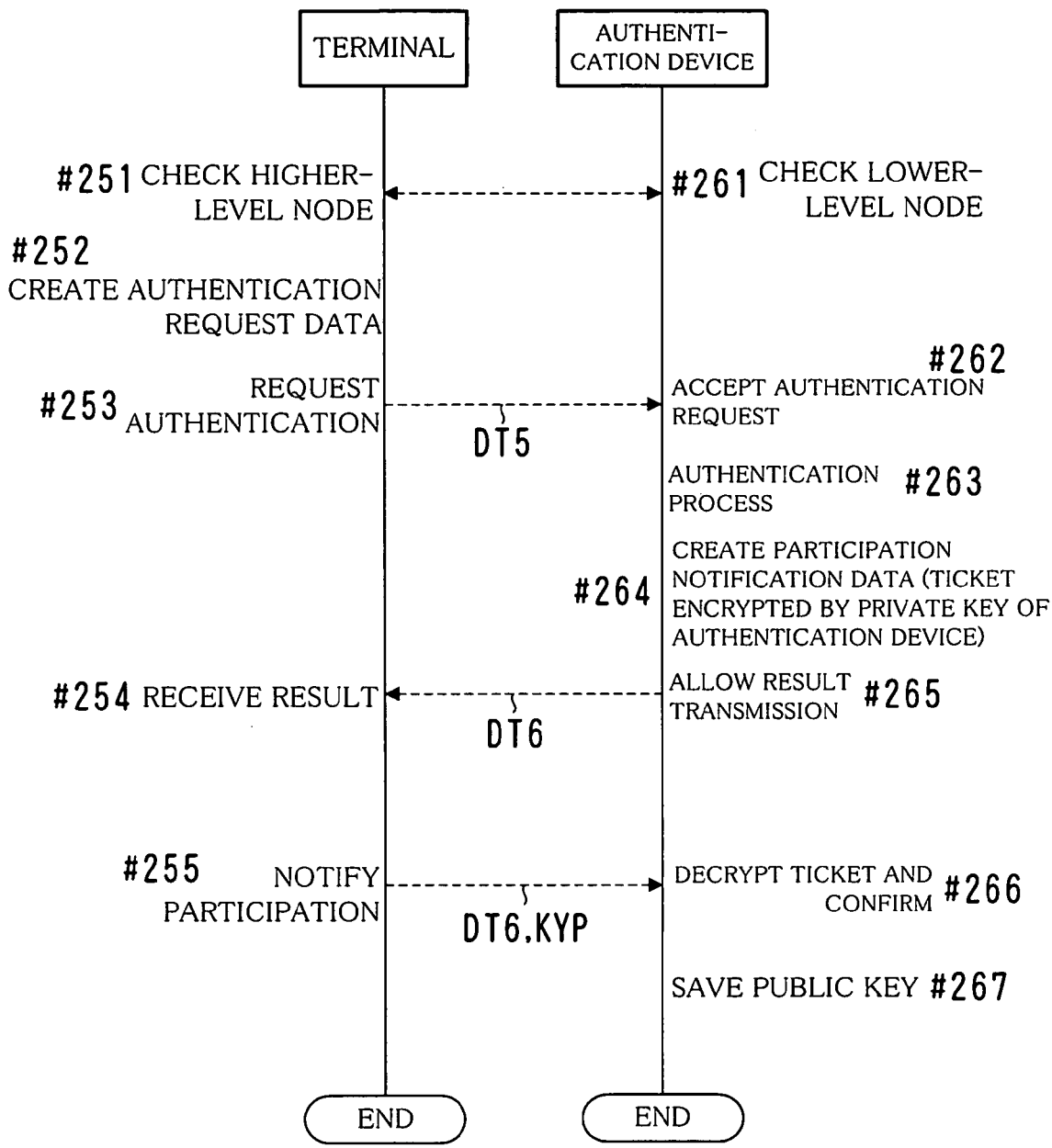
FIG. 13 is a flowchart showing a modification of the processing flow when the authentication device is used to perform an authentication process of a terminal.

FIG. 13 is a flowchart showing a modification of the processing flow when the authentication device 5 is used to perform an authentication process of the terminal 2. It is possible to perform the processing described with reference to FIG. 12 using the method shown in FIG. 13. Note that the description of parts overlapping with the processing in FIG. 12 is omitted.

The terminal 2 generates authentication request data DT5 (#252) and sends the same to the authentication device 5 (#253).

When receiving the authentication request data DT5 from the terminal 2 (#262), the authentication device 5 performs user authentication and node authentication of the terminal 2 (#263). As a result of the node authentication and the user authentication, if the authenticity of the terminal 2 and others can be verified, then the authentication device 5 creates authentication result data DT6 indicating that the terminal 2 has been authenticated (#264). The authentication device 5 encrypts the authentication result data DT6 using a private key KYS of the authentication device 5 to send the encrypted data to the terminal 2 (#265). On this occasion, a public key KYP of the authentication device 5 is also sent to the terminal 2.

In the case where the terminal 2 will join a network later, the terminal 2 sends the authentication result data DT6 to a terminal 2 as a higher-level node or the authentication device 5 with the authentication result data DT6 being encrypted (#255). On this occasion, the terminal 2 also sends its own public key KYP.

When receiving the authentication result data DT6, the terminal 2 as the higher-level node or the authentication device 5 decrypts the same and confirms that the terminal 2 as the transmission source is the terminal 2 given authentication (#266). Then, the terminal 2 as the higher-level node or the authentication device 5 saves the public key KYP of the terminal 2 as the transmission source (#267) and allows the terminal 2 as the transmission source to join the network.

FIG. 14 is a flowchart showing an example of a processing flow upon starting the terminal 2. The following is a description of the entire processing flow when the terminal 2 starts with reference to the flowchart of FIG. 14.

The terminal 2 refers to its own connection table STB to search for other terminal 2 with which communications can be performed (#1) when the terminal 2 is turned ON, when the terminal 2 restarts the operating system or when the terminal 2 joins a network for the first time. If no other terminal 2 with which communications can be performed is found, i.e., if the terminal 2 per se is the first terminal within the network or is standalone (Yes in #2), then the terminal 2 connects to the authentication device 5 to request the same to perform a node authentication process and a user authentication process of the terminal 2 per se (#3). The processing procedure of the terminal 2 and the authentication device 5 in this case is as described earlier with reference to FIG. 12.

Conversely, if other terminal 2 with which communications can be performed is found, i.e., if other terminal 2 is already present within the network (No in #2), then the terminal 2 requests any of the other terminal 2 to perform a node authentication process and a user authentication process (#4). The processing procedure in this case is as described earlier with reference to FIG. 6 or FIG. 9.

In this embodiment, a node authentication process and a user authentication process of a terminal 2 are performed by other terminal 2 with which data is directly exchanged. This can perform the authentication processes easily. Further, in the case where the terminal 2 is standalone, or in the case where no other terminal 2 with which data is directly exchanged has an authentication function, the authentication device 5 is made to perform the authentication processes. Thus, even in an initial stage for forming a network, it is possible to verify the authenticity of the first terminal 2 and the subsequent terminals 2, leading to the high security.

Further, according to this embodiment, the authentication device 5 can perform node authentication and user authentication of a standalone terminal 2. Accordingly, the authentication of the terminal 2 can be performed without constant connection to a network outside a company such as the Internet.

FIG. 15 is a flowchart showing a modification of the processing flow upon starting the terminal 2. In this embodiment, in the case where a terminal 2 cannot communicate with other terminal 2, a request for node authentication and others is made to the authentication device 5 according to the procedure shown in the flowchart of FIG. 12. Instead, however, the request may be made according to the procedure shown in the flowchart of FIG. 15 in order to enhance the security.

More specifically, when the terminal 2 is turned ON or restarts the operating system, the terminal 2 refers to its own connection table STB to search for other terminal 2 with which communications can be performed (#11). If the other terminal 2 with which communications can be performed is found, then the terminal 2 requests any of the other terminal 2 to perform a node authentication process and a user authentication process as in Step #4 shown in FIG. 14 (#13).

Conversely, if no other terminal 2 with which communications can be performed is found, i.e., if the terminal 2 per se is the first terminal within the network or standalone (Yes in #12), then the terminal 2 per se connects to the authentication device 5 (#14).

Incidentally, in some cases, the authentication device 5 is carried by a service person or an engineer of a manufacturer. If so, it is not clear that the authentication device 5 per se is reliable. Accordingly, processing is performed in the following procedure in order to verify the authenticity of the authentication device 5.

The terminal 2 obtains an authentication key from the manufacturer via a reliable route and a route without through the authentication device 5 (#15). For example, the terminal 2 accesses a site of the manufacturer via the Internet or a public line, downloads and obtains the authentication key. Alternatively, an authentication key recorded on a medium (paper, floppy disk or others) mailed from the manufacturer may be entered. Obtaining the authentication key may be performed in advance prior to Step #13. Note that the authentication key is a character string (digest, hash value) obtained by hashing an electronic certificate retained by the authentication device 5 using a predetermined hash function. The hash function may be, for example, SHA-1, MD5 or MASH. As for the digest and the hash value, "Secure Hash Standard" Federal Information Processing Standards Publication 180-1 and "The MD5 Message-Digest Algorithm", IETF RFC 1321 should be referred to.

Further, the terminal 2 receives from the connected authentication device 5 the electronic certificate, e.g., an X.509 certificate, of the authentication device 5. Then, the terminal 2 hashes the electronic certificate using the hash function that is the same as that used upon the creation of the authentication key, so that a hash value is calculated (#16). Alternatively, the terminal 2 extracts a digest included in the X.509 certificate. Then, a value of the authentication key obtained in Step #14 is compared with the value obtained in Step #15, thereby to determine whether the authentication device 5 is a reliable and proper device (#17). More specifically, if both the values are identical, then the authentication device 5 is determined to be a proper device. In contrast, if both the values are not identical, then it is determined not to be a proper device.

If it can be determined that the authentication device 5 is a proper device (Yes in #17), then the authentication device 5 is requested to perform a node authentication process and a user authentication process as in Step #3 shown in FIG. 14 (#18). If it cannot be determined that the authentication device 5 is a proper device (No in #17), a warning is displayed (#19) because the authentication by another reliable authentication device 5 is necessary. When the other reliable authentication device 5 is sent for, the processing of Step #14 or later is performed again.

Thus, authentication of the authentication device 5 is performed to verify the authenticity of the authentication device 5. Thereby, damage due to a fraud or an identity theft can be prevented more reliably.

In this embodiment, the terminal 2 is connected to the authentication device 5 via an interface such as USB. Instead, however, a configuration may be adopted in which a dedicated line for connecting to the authentication device 5 is provided and the terminal 2 is connected to the authentication device 5 via the dedicated line. Another configuration may be adopted in which a telephone number only for the authentication device 5 is prepared and dial-up connection is made to the telephone number.

In this embodiment, the description is provided of the case where authentication is performed between the terminals 2 within one segment. Instead, however, it is possible to perform authentication between the terminals 2 present in different segments across a router.

The present invention is suitably used for authentication of an information processor that is used as a node in a network such as a Multi Function Peripheral (MFP), a personal computer, a workstation, a router or a hub.

In the embodiments described above, the overall configuration of the network 1, the terminal 2 and the authentication device 5, the configurations of various portions thereof, the details of processing, the processing order, the method for node authentication, the method for user authentication and the like may be changed as needed, in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for authenticating an information processor used as a node among a plurality of nodes in a network, the method comprising:

when the information processor is capable of communicating with a node having an authentication function for authenticating other nodes among the plurality of nodes in the network, transmitting by the information processor authentication information required for requesting the node to authenticate the information processor;

when the information processor is incapable of communicating with any of nodes having the authentication function among the plurality of nodes in the network, connecting an authentication device carried by a person responsible for installing the information processor to the information processor via a serial interface;

obtaining by the information processor first key information of the authentication device from the authentication device via the serial interface and second key information of the authentication device through another route physically different from a route through which the first key information is obtained;

verifying by the information processor authenticity of the authentication device based on the first and second key information thus obtained;

when the authenticity of the authentication device has been successfully verified, outputting by the information processor the authentication information through the serial interface to the authentication device and requesting the authentication device to authenticate the information processor;

receiving by the authentication device the authentication information from the information processor; and performing by the authentication device authentication of the information processor based on the authentication information.

2. The method according to claim 1, wherein the information processor verifies authenticity of the authentication device before requesting the authentication device to perform the authentication process.

3. The method according to claim 1, wherein the first key information is an electronic certificate of the authentication device, and the authenticity of the authentication device is verified by determining whether a value obtained by substituting the electronic certificate into a predetermined hash function corresponds to the second key information.

4. The method according to claim 1, wherein the information processor is a multi function peripheral (MFP).

5. The method according to claim 1, wherein when the information processor is incapable of communicating with any nodes having the authentication function among the plurality of nodes in the network, the information processor is in a stand-alone state.

6. The method according to claim 1, wherein before requesting the authentication device to authenticate the information processor, the information processor obtains, as the first key information, an electronic certificate of the authentication device from the authentication device, and obtains, as the second key information, a hash value that is outputted by a device other than the authentication device and all of the nodes in the network and is calculated by substituting the first key information into a hash function, and the information processor performs authentication on the authentication device by comparing the hash value calculated by substituting the first key information into the hash function with the second key information.

7. A network system comprising:

an information processor used as a node among a plurality of nodes in a network; and an authentication device carried by a person responsible for installing the information processor;

wherein the information processor includes an authentication information transmission portion configured to transmit, when the information processor is capable of communicating with a node having an authentication function for authenticating other nodes among the plurality of nodes in the network, to the node having the authentication function, authentication information required for requesting said node to authenticate the information processor;

the information processor includes a connection portion configured to connect, when the information processor is incapable of communicating with any of nodes having the authentication function among the plurality of nodes in the network, to the authentication device via a serial interface;

a first key information obtaining portion configured to obtain first key information of the authentication device from the authentication device via the serial interface;

a second key information obtaining portion configured to obtain second key information of the authentication device through another route physically different from a route through which the first key information is obtained;

a first authentication portion configured to verify authenticity of the authentication device based on the first and second key information thus obtained; and an authentication request portion configured to, when the authenticity of the authentication device has been successfully verified, output the authentication information through the serial interface to the authentication device and requesting the authentication device to authenticate the information processor, and the authentication device includes a receiving portion configured to receive the authentication information from the information processor; and a second authentication portion configured to perform authentication of the information processor based on the authentication information.

* * * * *